(12) United States Patent
Yang

(10) Patent No.: US 12,132,961 B2
(45) Date of Patent: *Oct. 29, 2024

(54) SYSTEMS AND METHODS FOR EFFICIENT PROCESSING AND PRESENTATION OF ADVERTISEMENT BASED ON CONTENT RE-ENCODING

(71) Applicant: DISH Network L.L.C., Englewood, CO (US)

(72) Inventor: Yunfeng Yang, Aurora, CO (US)

(73) Assignee: DISH NETWORK L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/484,307

(22) Filed: Oct. 10, 2023

(65) Prior Publication Data

US 2024/0040194 A1 Feb. 1, 2024

Related U.S. Application Data

(63) Continuation of application No. 17/550,890, filed on Dec. 14, 2021, now Pat. No. 11,818,431.

(51) Int. Cl.
| | |
|---|---|
| *H04N 21/458* | (2011.01) |
| *H04N 19/40* | (2014.01) |
| *H04N 21/433* | (2011.01) |
| *H04N 21/4402* | (2011.01) |
| *H04N 21/81* | (2011.01) |

(52) U.S. Cl.
CPC ........... *H04N 21/458* (2013.01); *H04N 19/40* (2014.11); *H04N 21/433* (2013.01); *H04N 21/440218* (2013.01); *H04N 21/812* (2013.01)

(58) Field of Classification Search
CPC ............... H04N 21/458; H04N 21/433; H04N 21/440218; H04N 21/812;
(Continued)

(56) References Cited

U.S. PATENT DOCUMENTS

| | | |
|---|---|---|
| 9,066,138 B1 | 6/2015 | Kraiman et al. |
| 2007/0294292 A1 | 12/2007 | Hydrie et al. |

(Continued)

FOREIGN PATENT DOCUMENTS

| | | |
|---|---|---|
| EP | 3192272 B1 | 8/2021 |
| WO | WO 2013089964 A1 | 6/2013 |

OTHER PUBLICATIONS

International Search Report and Written Opinion, mailed Mar. 14, 2023, for International Patent Application No. PCT/US2022/081451, 11 pages.

*Primary Examiner* — Cynthia M Fogg
(74) *Attorney, Agent, or Firm* — Seed IP Law Group LLP

(57) ABSTRACT

Systems and methods for efficient processing and presentation of advertisement based on content re-encoding are provided. An example method includes receiving, by a receiving device, the program content stream and determining, by the receiving device, encoding information of the program content stream. The example method also includes determining timing for presenting a target advertisement, responsive to determining the timing for presenting the target advertisement, initiating re-encoding of content of the target advertisement to generate re-encoded advertisement content based on the encoding information, and enabling playback of the re-encoded advertisement content in accordance with the timing for presenting the target advertisement.

20 Claims, 5 Drawing Sheets

(58) Field of Classification Search
CPC ....... H04N 21/23424; H04N 21/44016; H04N 21/4331; H04N 21/8456; H04N 19/40; H04N 21/23418; H04N 21/234309; H04N 21/41407; H04N 21/23439; H04N 21/2662; H04N 21/43072; H04N 21/4402; H04N 21/44; H04N 21/25808; H04N 21/440236; H04N 21/4621; H04N 21/2358
USPC ...................................................... 725/53, 32
See application file for complete search history.

(56) References Cited

U.S. PATENT DOCUMENTS

| | | |
|---|---|---|
| 2008/0320543 A1* | 12/2008 | Wang ................ H04N 21/4122 725/131 |
| 2011/0103374 A1 | 5/2011 | Lajoie et al. |
| 2012/0167132 A1 | 6/2012 | Mathews et al. |
| 2013/0097634 A1 | 4/2013 | Jin et al. |
| 2015/0201227 A1 | 7/2015 | Krasko et al. |
| 2016/0057465 A1 | 2/2016 | Jones et al. |
| 2016/0073146 A1 | 3/2016 | Phillips et al. |
| 2016/0073176 A1 | 3/2016 | Phillips et al. |
| 2016/0212482 A1* | 7/2016 | Balko .............. H04N 21/42203 |
| 2016/0316233 A1 | 10/2016 | Ghadi et al. |
| 2017/0188115 A1 | 6/2017 | Bafekr |
| 2018/0234713 A1 | 8/2018 | Kwon et al. |
| 2019/0037273 A1* | 1/2019 | Ross .................... H04N 21/812 |
| 2019/0215556 A1 | 7/2019 | Nugent et al. |
| 2020/0204847 A1 | 6/2020 | Lykes et al. |
| 2021/0058654 A1* | 2/2021 | Estus ............... H04N 21/44008 |
| 2022/0141507 A1 | 5/2022 | Ram et al. |
| 2022/0321344 A1 | 10/2022 | Xu |
| 2022/0329641 A1 | 10/2022 | Giladi |

\* cited by examiner

SYSTEMS AND METHODS FOR EFFICIENT PROCESSING AND PRESENTATION OF ADVERTISEMENT BASED ON CONTENT RE-ENCODING

BACKGROUND

Technical Field

This disclosure generally relates to the technology of content delivery and presentation, and more particularly, to advertisement processing and presentation in connection with a program content stream.

Description of the Related Art

Program distributors deliver audio and/or video program content to its subscribers. The program content includes, for example, television programs, multimedia services, and the like. Program distributors or other entities may further deliver advertisement content. The program distributors typically deliver the audio/video content to its subscribers in one of industry-standard formats, for example, the Moving Picture Experts Group (MPEG) MPEG-4 transport stream format.

Subscribers often have a receiving device, such as a set-top box (STB), which may include a digital video recorder (DVR) or other similar content recording functionality. Advertisement content may have been encoded in a different format or other applicability than a program content stream that is being played via the STB, which can cause various delays, disruption, or other compatibility issues associated with their processing and presentation. There remains a need for efficient advertisement processing and presentation in connection with a program content stream.

BRIEF SUMMARY

A computer implemented method for efficient advertisement presentation in connection with a program content stream may be summarized as including receiving, by a computerized system, the program content stream, determining encoding information of the program content stream, determining timing for presenting a target advertisement, responsive to determining the timing for presenting the target advertisement, initiating re-encoding of content of the target advertisement to generate re-encoded advertisement content based, at least in part, on the encoding information, and enabling playback of the re-encoded advertisement content in accordance with the timing for presenting the target advertisement. Alternatively or in addition, the computerized system can send the encoding information to a remote server or cloud service for re-encoding the target advertisement, if the remote server or cloud service still maintains or otherwise has access to a copy of target advertisement. In some embodiments, the computerized system can request the remote server of cloud service to use an existing program content stream to re-encode advertisement(s) and send the re-encoded advertisement(s) (e.g., to applicable receiver(s)) so that re-encoded advertisement(s) can be played when needed.

In some embodiments, the content of the target advertisement is pre-downloaded and stored locally by the computerized system. In some embodiments, the computerized system includes a set-top box.

In some embodiments, the encoding information of the program content stream is at least partly associated with a decoder for playback of the program content stream. In some embodiments, the re-encoding of the content of the target advertisement enables playback of the re-encoded advertisement via the decoder.

In some embodiments, at least part of the re-encoding of the content of the target advertisement is performed during playback of the program content stream. In some embodiments, enabling playback of the re-encoded advertisement content comprises suspending playback of the program content stream via a decoder and performing playback of the re-encoded advertisement content via the decoder. In some embodiments, the method further comprises resuming playback of the program content stream via the decoder, responsive to completion of the playback of the re-encoded advertisement content.

A system can be summarized as including at least one computer processor and at least one memory coupled to the at least one computer processor. The at least one memory have computer-executable instructions stored thereon that, when executed by the at least one computer processor, cause the at least one computer processor to perform actions including determining encoding information of a program content stream during its playback, determining timing for presenting a target advertisement, responsive to determining the timing for presenting the target advertisement, initiating re-encoding of content of the target advertisement to generate re-encoded advertisement content based, at least in part, on the encoding information, and enabling playback of the re-encoded advertisement content in accordance with the timing for presenting the target advertisement.

In some embodiments, the content of the target advertisement is pre-downloaded and stored on the at least one memory. In some embodiments, the encoding information of the program content stream is at least partly associated with a decoder for playback of the program content stream. In some embodiments, the re-encoding of the content of the target advertisement enables playback of the re-encoded advertisement via the decoder.

In some embodiments, at least part of the re-encoding of the content of the target advertisement is performed during playback of the program content stream. In some embodiments, enabling playback of the re-encoded advertisement content comprises suspending playback of the program content stream via a decoder and performing playback of the re-encoded advertisement content via the decoder.

A non-transitory computer-readable storage medium has computer-executable instructions stored thereon that, when executed by at least one processor, can cause the at least one processor to perform actions including determining encoding information of a program content stream during its playback, determining timing for presenting a target advertisement, responsive to determining the timing for presenting the target advertisement, initiating re-encoding of content of the target advertisement to generate re-encoded advertisement content based, at least in part, on the encoding information, and enabling playback of the re-encoded advertisement content in accordance with the timing for presenting the target advertisement.

In some embodiments, the content of the target advertisement is pre-downloaded and stored locally on a set-top box. In some embodiments, the encoding information of the program content stream is at least partly associated with a decoder for playback of the program content stream. In some embodiments, the re-encoding of the content of the target advertisement enables playback of the re-encoded advertisement via the decoder.

In some embodiments, at least part of the re-encoding of the content of the target advertisement is performed during playback of the program content stream. In some embodiments, enabling playback of the re-encoded advertisement content comprises suspending playback of the program content stream via a decoder and performing playback of the re-encoded advertisement content via the decoder.

Figure 1A:
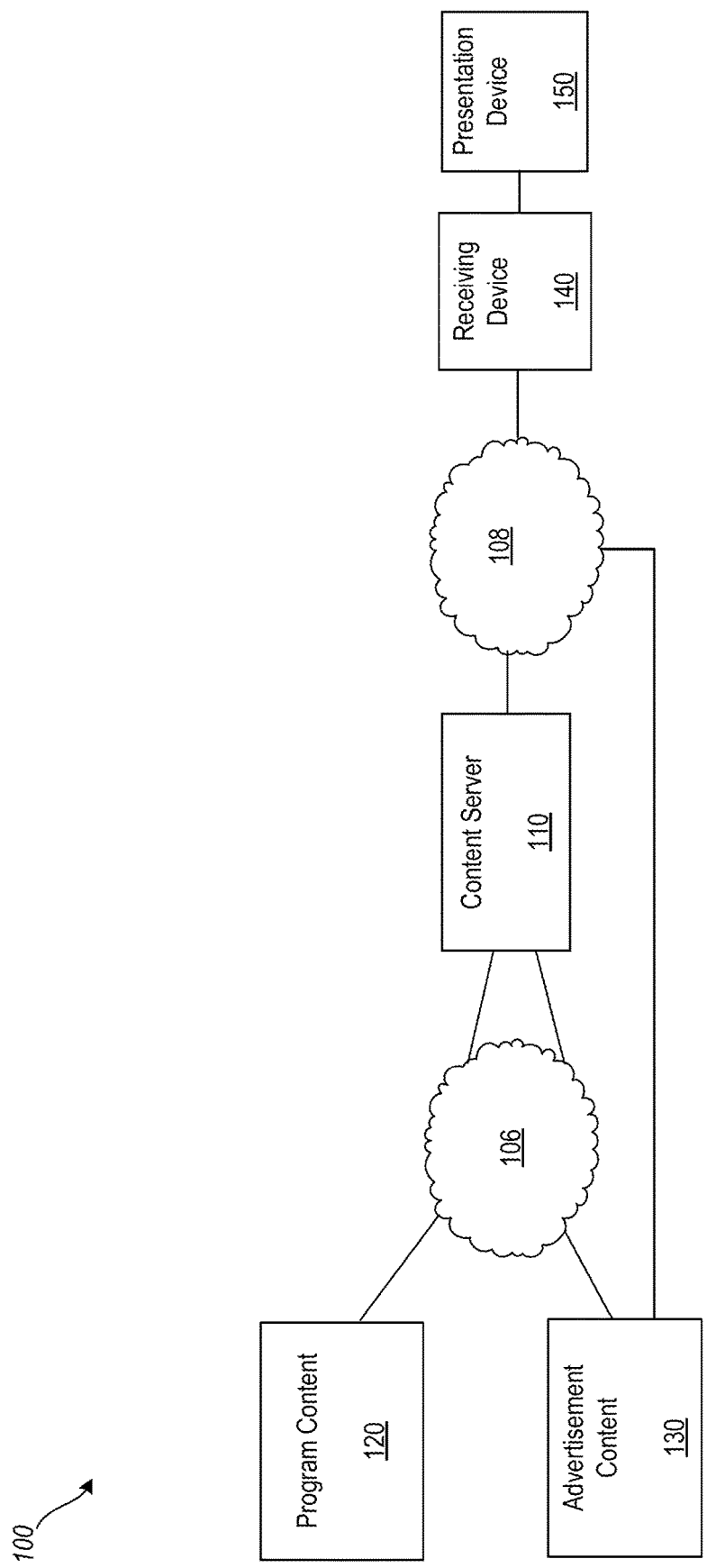
FIG. 1A is a block diagram illustrating an overview of a system for advertisement processing and presentation in connection with a program content stream, according to some embodiments.

In the drawings, identical reference numbers identify identical elements or elements in the same group and class. The sizes and relative positions of elements in the drawings are not necessarily drawn to scale. For example, the shapes of various elements and angles are not necessarily drawn to scale, and some of these elements are enlarged and positioned to improve drawing legibility. Further, the particular shapes of the elements as drawn are not intended to convey any information regarding the actual shape of the particular elements and have been selected for ease of recognition in the drawings.

DETAILED DESCRIPTION

Program distributors deliver audio and/or video program content to its subscribers. Subscribers often have a receiving device that can pre-download or otherwise access various advertisement content. Advertisement content may have been encoded in a different format (e.g., high/standard definition, compression standard, or the like) than a program content stream that is being played via the receiving device. In some cases, even if certain advertisement content shares the same format as the program content stream, the advertisement content is not associated with the same or otherwise compatible content identifier, timing parameters, or other factors as the program content stream, which are specific to a decoder used by the receiving device for playback of the program content stream.

Therefore, to "insert" an advertisement into program content playback typically involves the receiving device shutting off the program content stream (e.g., via hardware abstraction layer (HAL) STOP), flushing associated content buffer, reconfiguring or otherwise setting up the decoder to properly recognize or otherwise accommodate selected advertisement content, replenishing the content buffer to a sufficient level with the advertisement content, and then starting a stream of the advertisement content for playback (e.g., via HAL START). After the advertisement is presented, the receiving device may have to engage in a similar, cumbersome process to resume the playback of the program content stream. Such approaches of advertisement processing and presentation in connection with program content streaming can cause various delays (e.g., several seconds), disruption (e.g., black screen), or other compatibility and user experience issues.

The embodiments disclosed herein improve the technology of advertisement processing and presentation in connection with a program content stream and eliminate the cumbersome processes described above. In some embodiments, a computerized system (e.g., a subscriber's receiving device) receives a program content stream and determines encoding information of the program content stream. The encoding information of the program content stream is at least partly usable by or otherwise associated with a decoder for playback of the program content stream. For example, the encoding information can include content identification (e.g., packet identifier (PID) that the decoder is configured to accept content), timing information (e.g., present time stamp (PTS) of the stream being played), content resolution, compression format, or other factors compatible with the decoder.

The computerized system can determine the timing for presenting a target advertisement. For example, the computerized system can receive from a content server an advertisement insertion request or command, which can indicate a lead time (e.g., 5 seconds) before a selected target advertisement should be played. Responsive to determining the timing for presenting the target advertisement, the computerized system can initiate re-encoding (e.g., during playback of the program content stream) of the content of the target advertisement to generate re-encoded advertisement content based, at least in part, on the encoding information. The re-encoding allows the advertisement content to be identified, recognized, or otherwise accommodated by the decoder as if the advertisement content is part of the program content stream. For example, other than using the same format (e.g., HD, MPEG-4) as the program content stream to encode the target advertisement content, the receiving device also associates the target advertisement content with (1) the same PID(s) as the program content stream and (2) PTS(s) calculated based on the PTS(s) of the program content stream currently being played and the timing for advertisement presentation.

The computerized system then enables playback of the re-encoded advertisement content in accordance with the timing for presenting the target advertisement. In some implementations, the re-encoding is performed by a background process or thread, depending on the availability of computing resources. The entire advertisement content may be completely re-encoded prior to the time for the advertisement presentation. In some cases, re-encoding can take longer and part of the re-encoded advertisement content will be available by the time the advertisement should be presented. The computerized system can feed a content buffer with sufficient data of the re-encoded advertisement content, and connect it to the decoder at the time for advertisement presentation while disconnecting the program content buffer from the decoder. By switching the content source in this manner, the decoder identifies, recognizes, or otherwise determines the stream of advertisement content as a continuous part of the program content stream. As such, the playback of the program content stream smoothly transitions into the playback of the target advertisement. Once the presentation of the advertisement is completed, the computerized system can reconnect the program content buffer to the decoder while disconnecting the advertisement content buffer.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Well-known structures and methods associated with media content delivery have not been shown or described in detail to avoid unnecessarily obscuring descriptions of the preferred embodiments.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment," "an embodiment," or "some embodiments" means that a particular feature, structure or characteristic described in connection with the embodiment is included in at least one embodiment. Thus, the appearances of the phrases "in one embodiment," "in an embodiment," or "in some embodiments" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1A is a block diagram illustrating an overview of a system 100 for advertisement processing and presentation in connection with a program content stream, according to some embodiments.

It is to be appreciated that FIG. 1A illustrates one example of a system for advertisement processing and presentation in connection with the program content stream and that the various embodiments discussed herein are not limited to the example system of FIG. 1A. The system 100 may include a variety of communication systems and may use a variety of communication media including, but not limited to, satellite wireless media, cable media or any media over which communication of broadcast television programming, on-demand programming, and/or streaming media may occur, and/or over which Internet communication may occur.

The system 100 includes a content server 110, which receives program content 120 and which may access or receive advertisement content 130. Program content 120 may be provided from one or more content providers (not shown), which provide content such as video content and/or audio content (hereinafter "program content") to a distributor, such as a distributor operating the content server 110. The program content 120 may include content provided from content providers such as television stations which provide local or national video programming, special content providers which provide premium based programming or pay-per-view programming, and/or radio stations which provide audio programming. In addition, or in the alternative, the program content 120 may include content provided from on-demand content services, streaming media services, or the like which provide audio, video and other types of program content to the content server 110 for delivery of programming to a subscriber.

Advertisement content 130 may be provided to, or accessible by, the content server 110 from one or more advertisement sources, which may be or include one or more databases storing advertisement content 130. Advertisement content 130 may be provided to the content server 110 directly from advertisers, or from third party advertisement aggregators, services or the like.

The content server 110 receives the program content 120 and accesses or receives advertisement content 130 over a communication network 106, and the content server 110 is coupled to a receiving device 140 over a communication network 108. The receiving device 140 (e.g., a set-top box (STB), digital video recorder (DVR), media player, smartphone or mobile computing device) receives the program content 120 and receives or accesses the advertisement content 130 and connects to a presentation device (e.g., a television, monitor or other display device) 150 to display or otherwise present the program content 120 and advertisement content 130 received from the content server 110. In some embodiments, the receiving device 140 receives or accesses the advertisement content 130 directly from the another source outside of the content server 110 via communication network 108, such as directly from advertisers, or from third party advertisement aggregators, services or the like. In some embodiments, the receiving device 140 pre-downloads and locally stores at least some advertisement content 130, independently from receiving the program content 130.

The communication networks 106, 108 may be or include many different types of communication media, now known or later developed. Non-limiting media examples include telephony systems, the Internet, internets, cable networks, fiber optic networks, microwave networks, asynchronous transfer mode (ATM) systems, frame relay networks, packet switched networks, digital subscriber loop (DSL) systems, radio frequency (RF) networks and satellite systems. Further, program content 120 and/or advertisement content 130 may be communicated from program and advertisement content providers to the content server 110 and/or receiving device 140 over various combinations of media. For example, a television broadcast station may initially communicate program content, via an RF signal or other suitable medium, which is received and then converted into a digital signal suitable for transmission to the content server 110 over a fiber optics network. As another non-limiting example, an audio content provider may communicate audio content via its own satellite system to the content server 110.

The received program content 120 and/or advertisement content 130 is converted by one or more devices (not shown) as necessary at the content server 110 into a suitable signal that is communicated (i.e., "uplinked") by one or more antennae to one or more satellites (not separately illustrated herein, although considered part of the communication network 108). It is to be appreciated that the communicated uplink signal may contain a plurality of multiplexed programs. The uplink signal is received by the satellite and then communicated (i.e., "downlinked") from the satellite in one or more directions, for example, onto a predefined portion of the planet. It is appreciated that the format of the above-described signals are adapted as necessary during the various stages of communication.

An antenna that is within reception range of the downlink signal communicated from satellite receives the above-described downlink signal. The antenna can be located at a customer premises. Examples of customer premises include a residence, a business, a car, or any other suitable location operable to receive signals from satellite or other communication systems. The received signal is communicated, typically over a hard-wire connection, to the receiving device 140, which converts the received signal into a signal suitable for communication to a presentation device 150.

The receiving device 140 may receive content partially from, or entirely from, another source other than the above-described antenna. Other embodiments of the receiving device 140 may receive locally broadcast RF signals, and/or may be coupled to communication network 108 via any suitable medium. Non-limiting examples of media communicatively coupling the receiving device 140 to communication network 108 include cable, fiber optic, radio frequency, streaming or Internet media.

The receiving device 140, as well as any other devices shown in FIG. 1A or other devices or systems described herein, may include at least one computer processor coupled to at least one non-transitory memory, and is configured to execute computer-executable instructions to carry out, enable and/or otherwise perform applicable actions described herein of the system 100 and the different embodiments described herein. Examples of a receiving device 140 include, but are not limited to: a television converter, receiver, set-top box (STB), television receiving device, television receiver, television recording device, satellite set-top box, satellite receiver, cable set-top box, cable receiver, personal computer, media player, mobile device, tablet computing device, smart phone and/or television tuner. Accordingly, the receiving device 140 may be any suitable converter device or electronic equipment that is operable to receive programming (i.e., program content 120 and advertisement content 130). Further, the receiving device 140 may itself include user interface devices, such as buttons, switches, a display, and may include the presentation device 150. Additionally, the receiving device 140 may include recording capability, and may be or include a digital video recorder (DVR).

Examples of a presentation device 150 include, but are not limited to: a television (TV), a personal computer (PC), a media player, mobile device, tablet computing device, smart phone or the like. Presentation devices 150 employ a display, one or more speakers and/or other output devices to communicate program content 120 and/or advertisement content 130 to a user. In many implementations, one or more presentation devices 150 reside in or near a customer's premises and are communicatively coupled, directly or indirectly, to the receiving device 140.

Figure 1B:
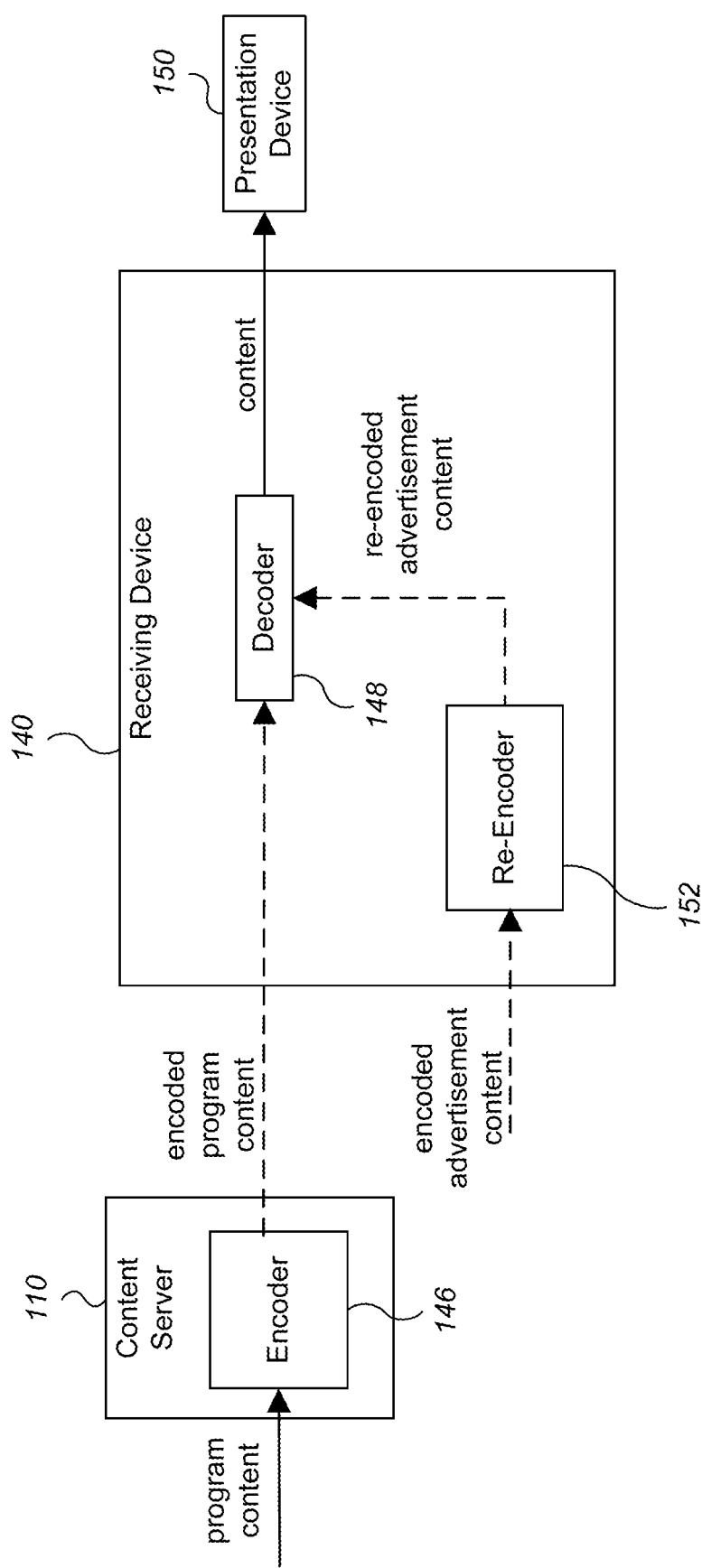
FIG. 1B is a context diagram illustrating advertisement content re-encoding in accordance with the system of FIG. 1A and other applicable embodiments described herein.

FIG. 1B is a context diagram illustrating advertisement content re-encoding in accordance with the system 100 and other applicable embodiments described herein. In this illustrated example, the content server 110 receives program content. The program content may be received via over-the-air television signals, or it may be received from one or more content providers or information providers via other communication connections. The received program content is provided to one or more encoders 146, which encodes the program content to create encoded program content. The encoding may be any of a variety of encoding mechanisms that compress, reduce, or otherwise alter the format of the content. In some embodiments, while encoding the program content, the encoder 146 also generates encoding metadata describing how the encoder 146 is encoding the content, e.g., content resolution or definition, information identifying how groups of pictures are generated, where anchor frames are located, distance between two full images, motion vector estimation information, stat-mux data, or other types of hinting information that instructs another computing device how to encode the content. In some embodiments, encoding metadata includes information specifically directed to or usage by a decoder at the receiving device, e.g., information for programing and timing control such as packet identifier (PID), present time stamp (PTS), or the like.

The content server 110 transmits the encoded program content (and in some embodiments, the encoding metadata) to the receiving device 140 (e.g., on the viewer's premises), e.g., as a data stream. The content server 110 may transmit the encoded program content to the receiving device 140 via a satellite connection or via other terrestrial wired or wireless communication networks.

The receiving device 140 includes a decoder 148. In this example, the decoder 148 decodes the received encoded program content for presentation on the presentation device 150. The receiving device 140 can receive advertisement content that is encoded differently than the encoded program content. The encoded advertisement content may be provided by the content server 110 prior to the streaming of the current encoded program content or provided by other advertisement sources. The encoded advertisement content may be stored locally on the receiving device 140 and selected for presentation during playback of the current program content stream. The receiving device 140 includes a re-encoder 152 that can receive the encoded advertisement content and re-encode it in accordance with how the current program content stream is encoded. In some embodiments, the re-encoder 152 uses the encoding metadata to re-encode the advertisement content. Once re-encoded, the advertisement content can be fed directly to the decoder 148 for decoding, without delay, disruption, or other incompatibility with the current program content stream, in accordance with various embodiments of the technology described herein.

Figure 2:
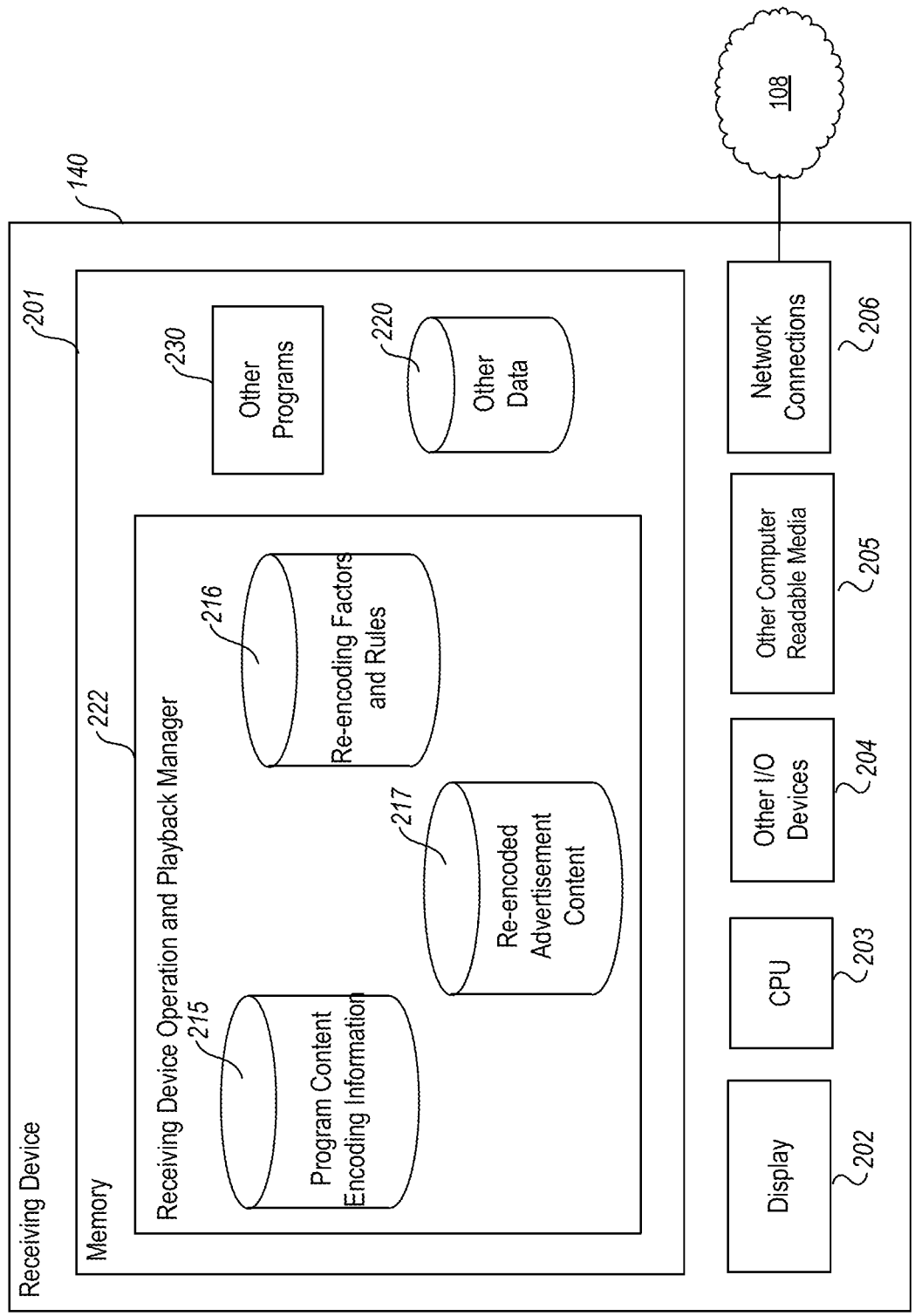
FIG. 2 is a block diagram illustrating elements of an example receiving device, according to some embodiments.

FIG. 2 is a block diagram illustrating elements of an example receiving device 140, according to some embodiments.

In some embodiments, the receiving device 140 is a device configured to play media content on a presentation device. The receiving device may display programming and/or play audio on a presentation device, such as on a display or speaker. The receiving device 140 may also be configured to receive and record such content from remote sources. In some embodiments, the receiving device 140 is a presentation device, such as a television, smartphone, smart speaker, internet appliance or tablet device, or may be a set-top box or digital video recorder (DVR) device.

Note that one or more general purpose or special purpose computing systems/devices may be used to operate the receiving device 140. In addition, the receiving device 140 may comprise one or more distinct computing systems or devices, and may span distributed locations. Furthermore, each block shown may represent one or more such blocks as appropriate to a specific embodiment or may be combined with other blocks. Also, the receiving device operation and playback manager 222 may be implemented in software, hardware, firmware, or in some combination to achieve the capabilities described herein.

In example shown, the receiving device 140 comprises a computer memory ("memory") 201, a display 202, one or more Central Processing Units or other processors ("CPU") 203, Input/Output devices 204 (e.g., button panel, RF or infrared receiver, light emitting diode (LED) panel, liquid crystal display (LCD), USB ports, digital audio, High-Definition Multimedia Interface (HDMI) ports, other communication ports, and the like), other computer-readable media 205, and network connections 206 (e.g., Wi-Fi interface(s), Bluetooth® interface, short range wireless interface, personal area network interface, Ethernet port(s), and/or other network ports). The presentation device 150 shown in FIG. 1A may be coupled to the receiving device 140 via one or more Input/Output devices 204 and/or network connections 206, such as an HDMI port, Wi-Fi interface and/or Bluetooth® interface, for example.

The receiving device operation and playback manager 222 is shown residing in memory 201. In other embodiments, some portion of the contents and some, or all, of the components of the receiving device operation and playback manager 222 may be stored on and/or transmitted over the other computer-readable media 205. The components of the receiving device operation and playback manager 222 can execute on one or more CPUs or other processors 203 and facilitate the receiving, decoding, processing, re-encoding, playback, or displaying of program or advertisement content in accordance with various embodiments described herein. The receiving device operation and playback manager 222 can include a program content encoding information storage 215 configured to store encoding information of program content stream(s), a re-encoding factors and rules storage 216 configured to store factors and rules regarding re-encoding advertisement content, and a re-encoded advertisement content storage 217 configured to store re-encoded advertisement content (e.g., in part or in whole).

As described herein, the receiving device operation and playback manager 222 may interact via the communication system 108 with other devices. For example, the other device may be a home computing system (e.g., a desktop computer, a laptop computer, mobile device, etc.) that includes or has access to (e.g., via communication system 108) the functionality of the content server 110 or other systems.

Other code or programs 230 (e.g., an audio/video processing module, a program guide manager module, a Web server, and the like), and potentially other data repositories, such as data repository 220 for storing other data (user profiles, preferences and configuration data, etc.), also reside in the memory 201, and can execute on one or more CPUs 203. Of note, one or more of the components in FIG. 2 may or may not be present in any specific implementation. For example, some embodiments may not provide other computer readable media 205 or a display 202.

In some embodiments, the receiving device operation and playback manager 222 includes an application program interface ("API") that provides programmatic access to one or more functions of the receiving device operation and playback manager 222. For example, such an API may provide a programmatic interface to one or more functions of the receiving device operation and playback manager 222 that may be invoked by one of the other programs 230, content server 110, or some other module or system. In this manner, the API may facilitate the development of third-party software, such as user interfaces, plug-ins, adapters (e.g., for integrating functions of the receiving device operation and playback manager 222), and the like to facilitate various functionalities described herein.

In an example embodiment, components/modules of the receiving device 140 and receiving device operation and playback manager 222 are implemented using standard programming techniques. For example, the receiving device operation and playback manager 222 may be implemented as a "native" executable running on the CPU 203, along with one or more static or dynamic libraries. In other embodiments, the receiving device 140 and receiving device operation and playback manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like). In a software or firmware implementation, instructions stored in a memory configure, when executed, one or more processors of the receiving device 140 to perform the functions of the receiving device operation and playback manager 222.

The embodiments described above may also use other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a receiving device operation and playback manager 222 implementation. Also, other functions could be implemented and/or performed by each component/module, and in different orders, and by different components/modules, yet still achieve the functions of the receiving device 140 and the receiving device operation and playback manager 222.

In addition, programming interfaces to the data stored as part of the receiving device 140 and receiving device operation and playback manager 222, can be available by standard mechanisms such as through C, C++, C#, and Java APIs; libraries for accessing files, databases, or other data repositories; scripting languages such as XML; or Web servers, FTP servers, or other types of servers providing access to stored data. The program content encoding information storage 215, the re-encoding factors and rules storage 216, and the re-encoded advertisement content storage 217 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation and playback manager 222.

Furthermore, in some embodiments, some or all of the components of the receiving device 140 and the receiving device operation and playback manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
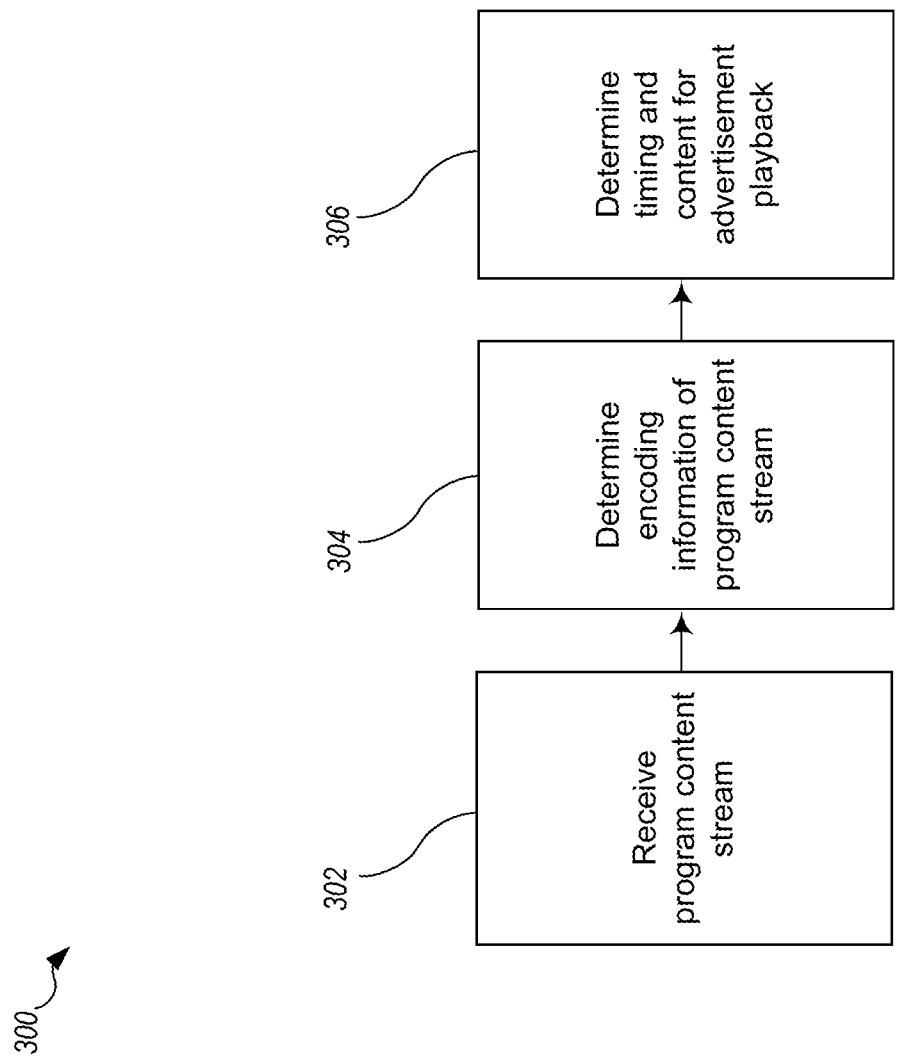
FIG. 3 is a flowchart illustrating a method 300 for preparing for re-encoding of the advertisement content based on a program content stream during the playback of the program content stream, according to some embodiments.

FIG. 3 is a flowchart illustrating a method 300 for preparing for re-encoding of advertisement content based on a program content stream during the playback of the program content stream, according to some embodiments. The method 300 can be implemented, at least in part, by the receiving device 140.

At block 302, the method 300 includes receiving a program content stream, for example, from the content server 110. As described above, the program content includes, for example, television programs, multimedia services, and the like. It can be delivered in an industry-standard format, at a certain resolution, based on a type of compression technique, associated with a particular content identification, carrying timing parameters for the stream, or otherwise including information specifically usable to a pre-configured decoder of the receiving device 140 for decoding and presentation of the program content stream. In some embodiments, the method 300 also includes receiving encoding metadata associated with the program content stream. The encoding metadata can be received either independently from the program content stream or as part of the stream.

At block 304, the method 300 includes determining encoding information of the program content stream. This can be achieved by processing and analyzing the program content stream itself. In some embodiments, this is achieved, at least in part, by processing and analyzing the encoding metadata. In some embodiments, the determining of encoding information occurs before or during the playback of the program content stream. The determined encoding information can be a subset of the encoding information described above with reference to block 302. In some embodiments, only some of the encoding information (e.g., content identification, stream timing control information, or the like) that is necessary for the same decoder to identify, recognize, or otherwise accommodate the program content stream for playback is extracted.

At block 306, the method 300 includes determining the timing and content for advertisement playback. In some embodiments, the receiving device receives from the content server (or another system) an advertisement insertion request or command, which can indicate a selected target advertisement and a lead time (e.g., 10 seconds) before the target advertisement is to be played. In some embodiments, the target advertisement is downloaded and stored locally on the receiving device with other advertisements. One or more versions, formats, or other forms of each advertisement can exist on the receiving device. In some embodiments, the receiving device can select a form of the target advertisement most suitable for efficient re-encoding based on the encoding information determined at block 304. For example, the selected form of the target advertisement can have one or more of the same resolution, compression format, or other encoding features as the program content stream currently being played.

Figure 4:
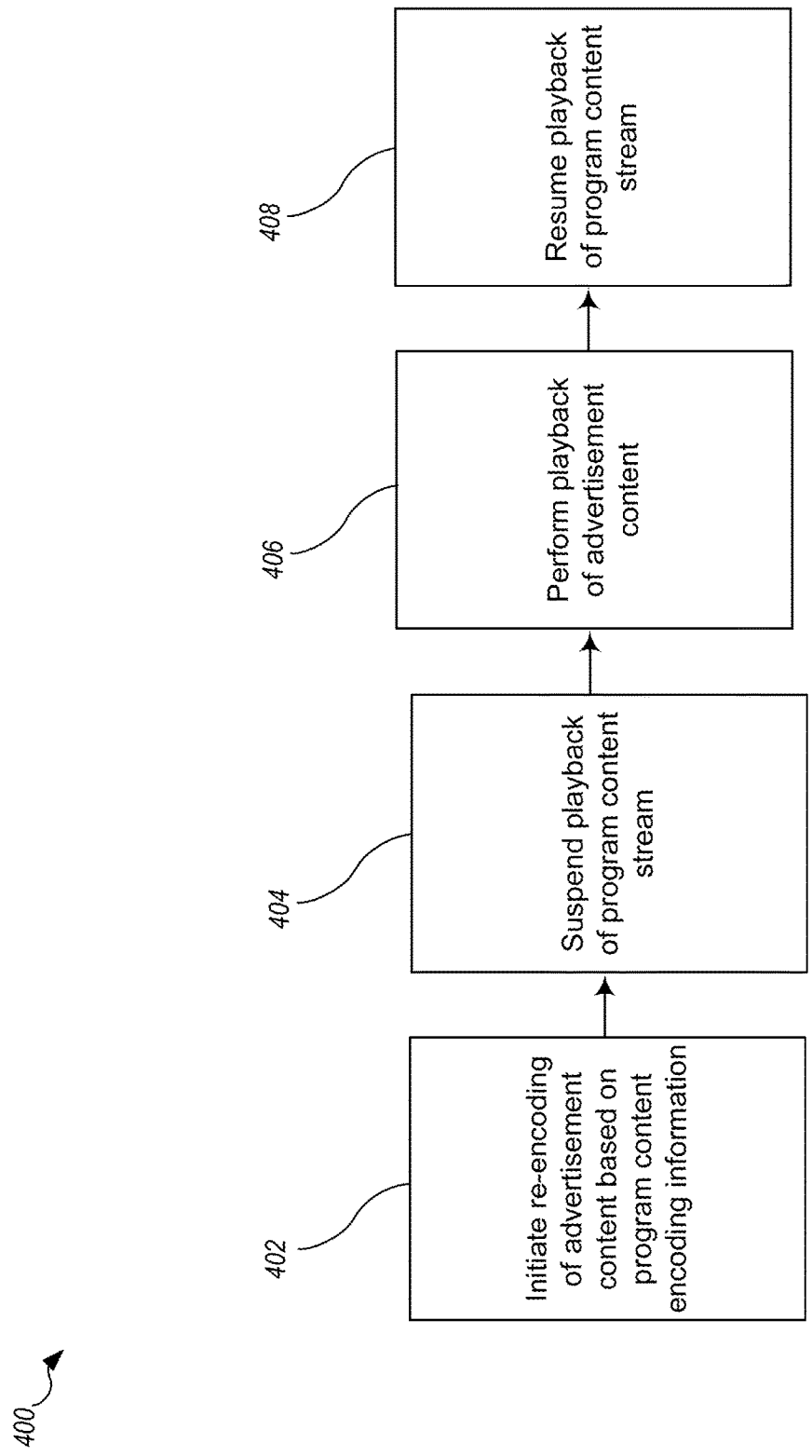
FIG. 4 is a flowchart illustrating a method 400 for re-encoding and presenting an advertisement in connection with a program content stream, according to some embodiments.

FIG. 4 is a flowchart illustrating a method 400 for re-encoding and presenting an advertisement in connection with a program content stream, according to some embodiments. The method 400 can be implemented, at least in part, by the receiving device 140.

At block 402, the method 400 includes initiating re-encoding of advertisement content based on encoding information of the program content stream. In some embodiments, responsive to determining the timing for presenting the target advertisement, the receiving device can initiate re-encoding (e.g., during playback of the program content stream) of the content of the target advertisement (e.g., selected from more than one pre-downloaded forms of the advertisement) to generate re-encoded advertisement content, based on the encoding information of the program content stream.

The re-encoding allows the advertisement content to be identified, recognized, or otherwise accommodated by the decoder as if the advertisement content is part of the program content stream. For example, other than re-encoding the target advertisement with format, resolution, or the like that is the same as or compatible with the program content stream as necessary, the receiving device associates the target advertisement content with content identification, timing control information, or other features that are specifically usable by the decoder to identify, recognize, or otherwise accommodate the program content stream currently being played.

In some implementations, the re-encoding is performed by a background process or thread depending on the availability of computing resources of the receiving device. The entire advertisement content may be completely re-encoded prior to time for presentation of the advertisement, yet in some cases, re-encoding can take longer and only part of the re-encoded advertisement content will be available by the time the advertisement should be presented.

At block 404, the method 400 includes suspending the playback of the program content stream. Here, the receiving device can feed a content buffer with sufficient data of the re-encoded advertisement content, and connect it to the decoder at the time for advertisement presentation while disconnecting the program content buffer from the decoder.

At block 406, the method 400 includes performing the playback of the advertisement content. By switching the content source to the decoder in the manner as described, the decoder can identify, recognize, or otherwise determine the stream of advertisement content as a continuous part of the program content stream. As such, the playback of the program content stream smoothly transitions into the playback of the target advertisement.

At block 408, the method 400 includes resuming the playback of the program content stream. Once the presentation of the advertisement is completed, the receiving device can reconnect the program content buffer to the decoder while disconnecting the advertisement content buffer.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method for efficient advertisement presentation, comprising:
receiving, by a content receiving and playback device, a program content stream;
playing back, by the content receiving and playback device, the program content stream;
determining, by the content receiving and playback device, encoding information of the program content stream;
re-encoding, by the content receiving and playback device, content of a target advertisement that was pre-downloaded to the content receiving and playback device from a remote system, to generate re-encoded advertisement content on the content receiving and playback device based, at least in part, on the encoding information; and
enabling playback, by the content receiving and playback device, of the re-encoded advertisement content during the playing back of the program content stream by the content receiving and playback device.

2. The method of claim 1, wherein the re-encoding of the content of the target advertisement is partially performed prior to the enabling of the playback of the re-encoded advertisement content.

3. The method of claim 1, wherein the content receiving device and playback device includes a set-top box.

4. The method of claim 1, wherein the encoding information of the program content stream is at least partly associated with a decoder for playback of the program content stream.

5. The method of claim 4, wherein the decoder resides within the content receiving and playback device.

6. The method of claim 1, wherein at least part of the re-encoding of the content of the target advertisement is performed during playback of the program content stream.

7. The method of claim 1, wherein enabling playback of the re-encoded advertisement content comprises suspending playback of the program content stream via a decoder and performing playback of the re-encoded advertisement content via the decoder.

8. The method of claim 7, further comprising resuming playback of the program content stream via the decoder, responsive to completion of the playback of the re-encoded advertisement content.

9. A content receiving and playback system, comprising:
at least one computer processor; and
at least one memory coupled to the at least one computer processor, the at least one memory having computer-executable instructions stored thereon that, when executed by the at least one computer processor, cause the content receiving system to perform actions comprising:
determining encoding information of a program content stream received by the content receiving system;
re-encoding content of a target advertisement that was pre-downloaded to the content receiving and playback system from a remote system, to generate re-encoded advertisement content in the content receiving and playback system based, at least in part, on the encoding information; and
enabling playback of the re-encoded advertisement content during playback of the program content stream by the content receiving and playback system.

10. The system of claim 9, wherein the re-coding of the content of the target advertisement is partially performed prior to the enabling of the playback of the re-encoded advertisement content.

11. The system of claim 9, wherein the encoding information of the program content stream is at least partly associated with a decoder for playback of the program content stream.

12. The system of claim 11, wherein the decoder resides within the content receiving and playback system.

13. The system of claim 9, wherein at least part of the re-encoding of the content of the target advertisement is performed during playback of the program content stream.

14. The system of claim 9, wherein enabling playback of the re-encoded advertisement content comprises suspending playback of the program content stream via a decoder and performing playback of the re-encoded advertisement content via the decoder.

15. A non-transitory computer-readable storage medium having computer-executable instructions stored thereon that, when executed by at least one processor, cause actions to be performed, the actions comprising:
determining encoding information of a program content stream received by a set-top box;
re-encoding, by the set-top box, content of a target advertisement that was pre-downloaded to the set-top box, to generate re-encoded advertisement content on the set-top box based, at least in part, on the encoding information; and
enabling playback, by the set-top box, of the re-encoded advertisement content during playback of the program content stream by the set-top box.

16. The computer-readable storage medium of claim 15, wherein the re-encoding of the content of the target advertisement is partially performed prior to the enabling of the playback of the re-encoded advertisement content.

17. The computer-readable storage medium of claim 15, wherein the encoding information of the program content stream is at least partly associated with a decoder for playback of the program content stream.

18. The computer-readable storage medium of claim 17, wherein the decoder resides within the set-top box.

19. The computer-readable storage medium of claim 15, wherein at least part of the re-encoding of the content of the target advertisement is performed during playback of the program content stream.

20. The computer-readable storage medium of claim 15, wherein enabling playback of the re-encoded advertisement content comprises suspending playback of the program content stream via a decoder and performing playback of the re-encoded advertisement content via the decoder.

* * * * *